July 2, 1946.　　　M. P. WINTHER　　　2,403,421
ELECTROMAGNETIC APPARATUS
Filed March 12, 1945　　　6 Sheets-Sheet 1

Martin P. Winther,
Inventor.
Haynes and Koenig
Attorneys.

July 2, 1946.　　　M. P. WINTHER　　　2,403,421
ELECTROMAGNETIC APPARATUS
Filed March 12, 1945　　　6 Sheets-Sheet 3

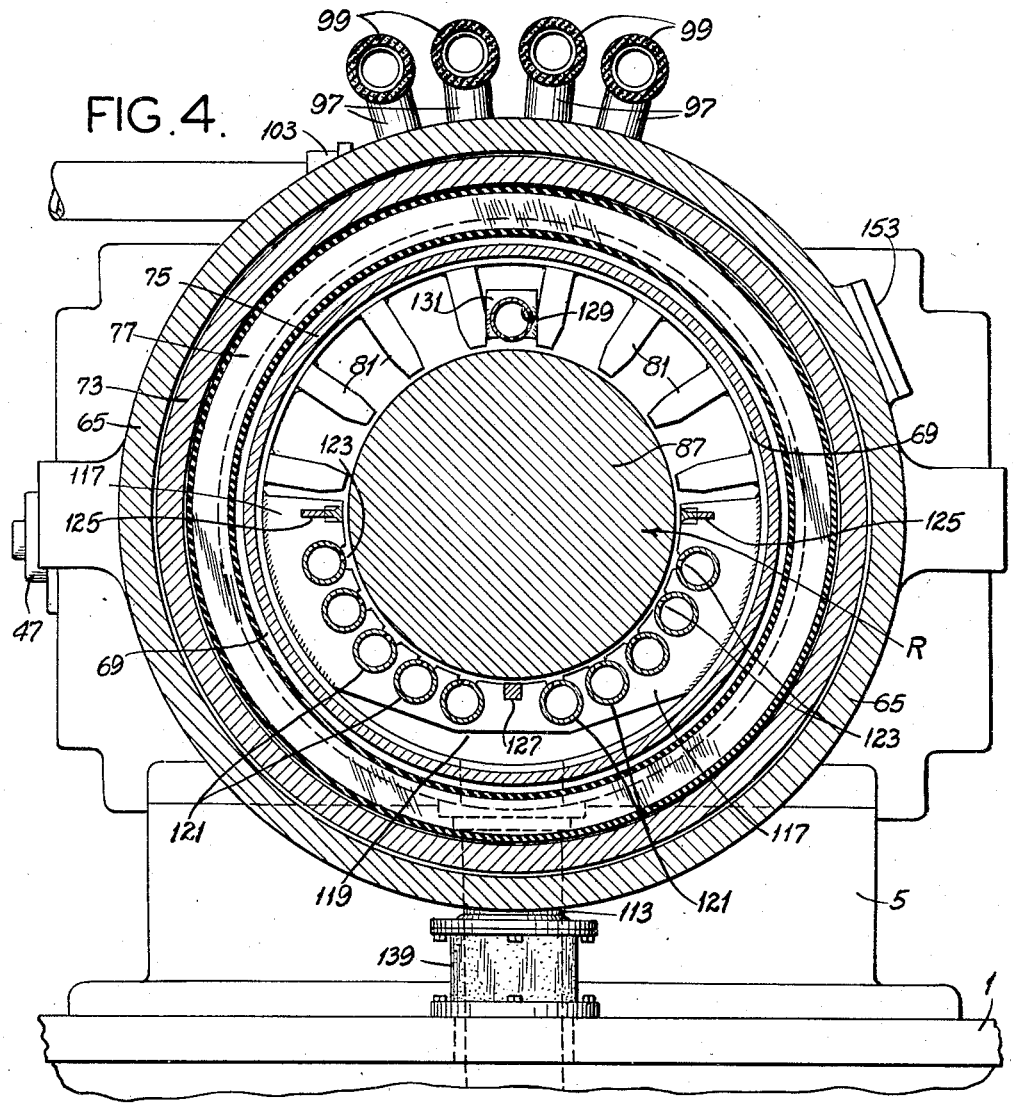

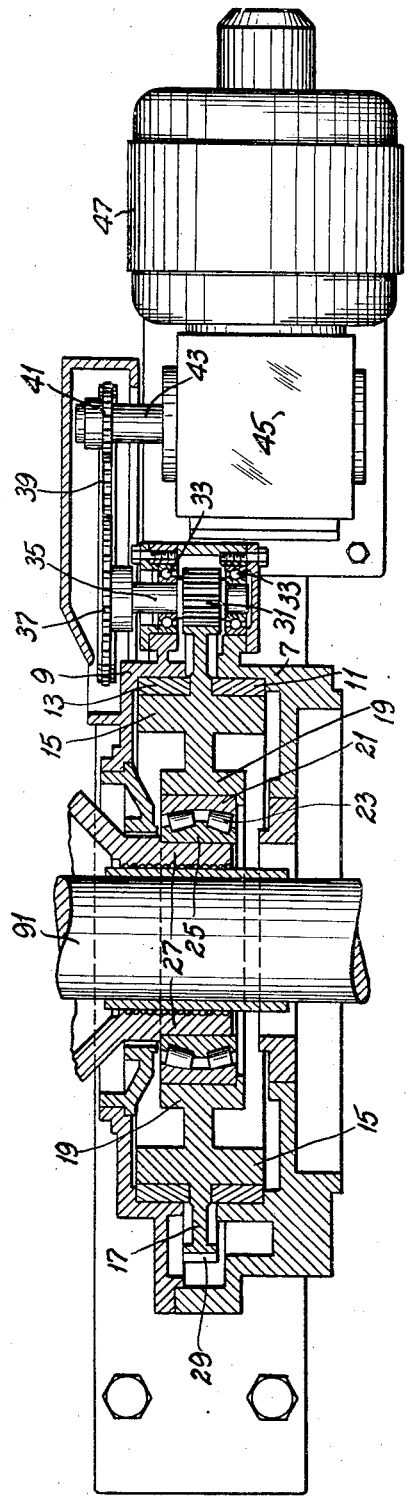

July 2, 1946.                     M. P. WINTHER                      2,403,421
                              ELECTROMAGNETIC APPARATUS
                              Filed March 12, 1945           6 Sheets-Sheet 6

Martin P. Winther,
         Inventor.
Haynes and Koenig
         Attorneys.

Patented July 2, 1946

2,403,421

UNITED STATES PATENT OFFICE 2,403,421

ELECTROMAGNETIC APPARATUS

Martin P. Winther, Waukegan, Ill., assignor to Martin P. Winther, as trustee

Application March 12, 1945, Serial No. 582,301

18 Claims. (Cl. 188—104)

1

This invention relates to electromagnetic apparatus, and with regard to certain more specific features, to high-speed, high-capacity dynamometers and the like.

Among the several objects of the invention may be noted the provision of a water-cooled, eddy-current dynamometer adapted to operate safely at high speeds and to absorb heavy loads; the provision of a dynamometer of the class described which will pass large volumes of cooling water for high rates of energy absorption without introducing parasitic unsteady torque; the provision of a machine of the class described which employs a rotor and a method of cooling it adapted to minimize distortions under high rotor speeds; and the provision of a machine of this class which is simple and economical to build and maintain. Other objects will be in part obvious and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings, in which is illustrated one of various possible embodiments of the invention, Fig. 1 is an end view of one component dynamometer unit embodying features of the invention;

Fig. 4 is a vertical section taken on line 4—4 of Fig. 3;

Fig. 5 is a horizontal section taken on line 5—5 of Fig. 1 but on a further enlarged scale;

Similar reference characters indicate corresponding parts throughout the several views of the drawings.

Increasing sizes of engines to be tested at high speeds are presenting increasing problems in the dynamometer test field. By means of the apparatus herein described 15,000 H. P. may be absorbed at from 8,000 to 12,000 R. P. M. This is done with relatively simple and safe apparatus requiring a minimum in control organization.

2

Figure 1:
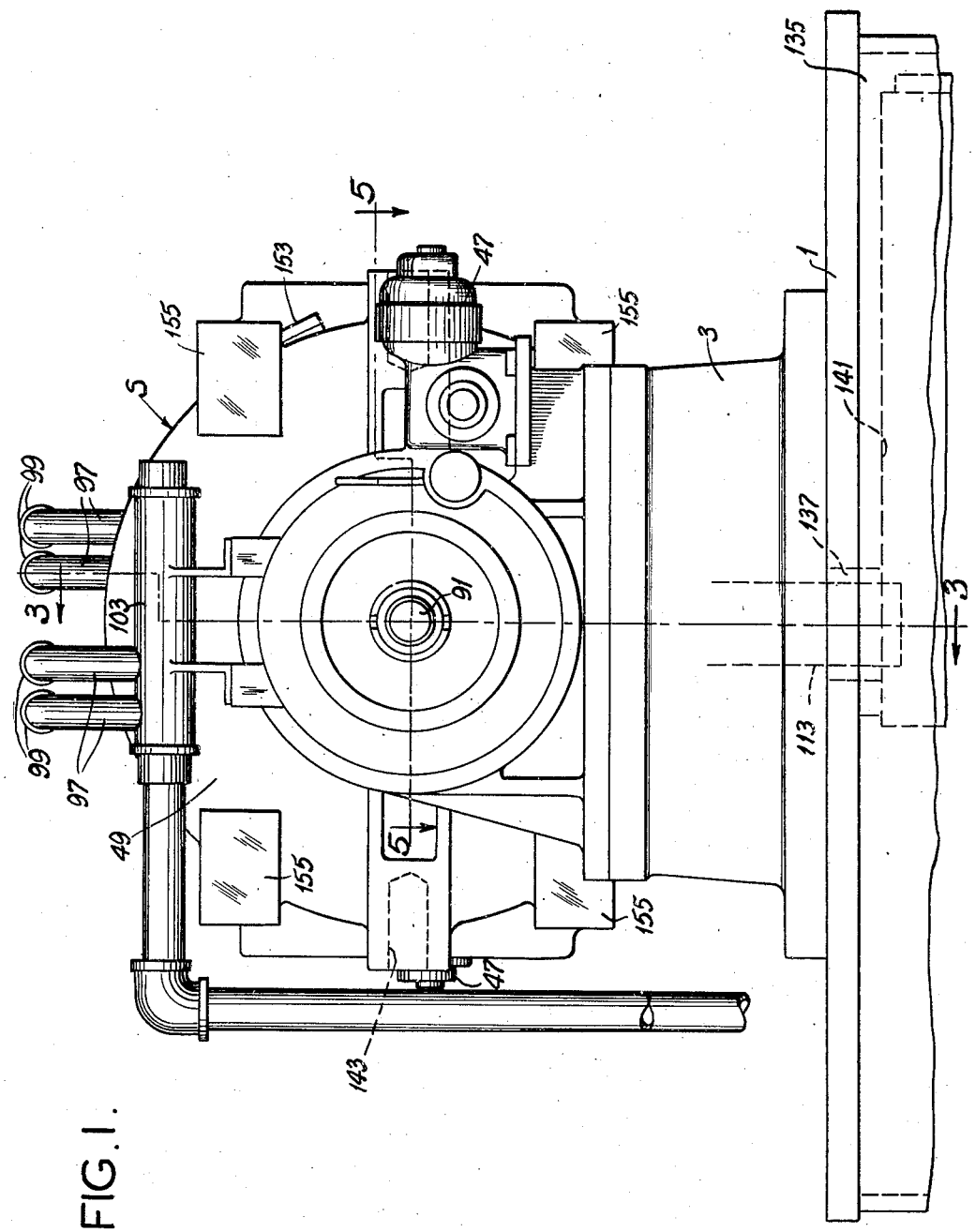
Figure 2:
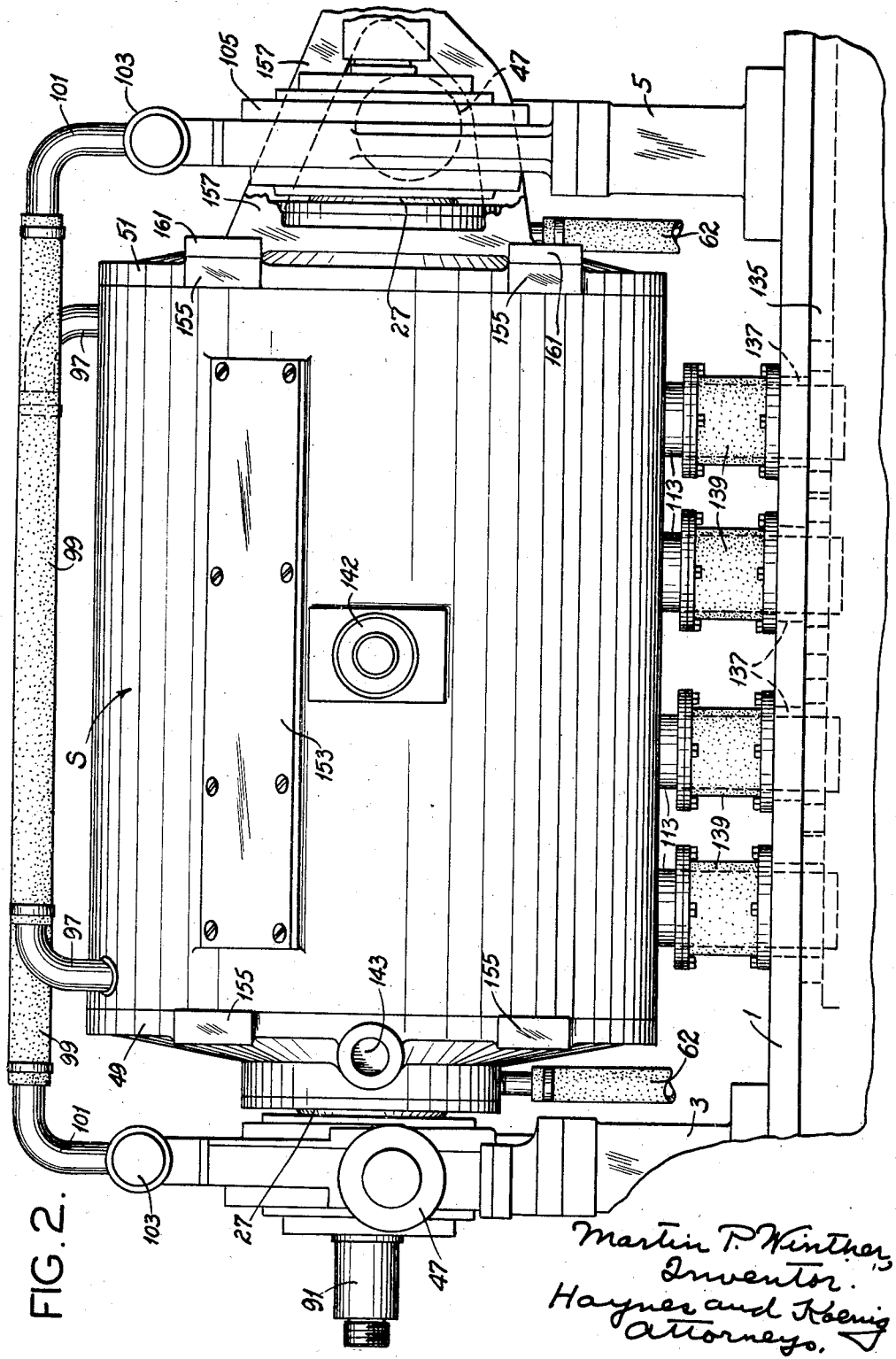
Fig. 2 is a left-side view of Fig. 1.

Referring now more particularly to Fig. 1, there is shown at numeral 1 a platform, upon which are mounted pedestals 3 and 5 (Fig. 2). The pedestals 3 incorporate bearing structures which are not new herein but which are described for completeness. Each of these bearings (note the one of Fig. 3 for example) consists in enclosing members 7 and 9 wherein are supporting bearing rings 11 and 13 for supporting outer bearing flanges 15 of a ring gear 17, the rim of the latter extending radially between the bearing rings 11 and 13 (see also Fig. 5). An inner hub 19 of the ring gear contains the outer race 21 of a roller bearing 23. The inner race 25 of this bearing 23 is carried on a neck 27 of a rocking stator S, to be described hereunder in detail.

As indicated in Fig. 5, the teeth 29 of the gear 17 mesh with a pinion 31 on a countershaft 35 supported in outboard bearings 33. The countershaft 35 carries a sprocket 37 connected by a chain 39 with a sprocket 41 on the shaft 43 of a worm-gear speed reducer 45. The speed reducer 45 is continuously driven from a motor 47. The purpose of this type of bearing for each neck 27 is to maintain a continuous slow rolling of the bearings 23 so that each does not continuously load one spot on the races 21 and 25, as would be substantially the case if these bearings did not continuously progress. It will be appreciated from what follows that each neck 27, although it rocks slightly, is essentially stationary during operation, the anti-friction bearing being basically necessary for the purpose of preventing loss of torque applied through the stator S to a suitable dynamometer measuring scale.

Figure 3:
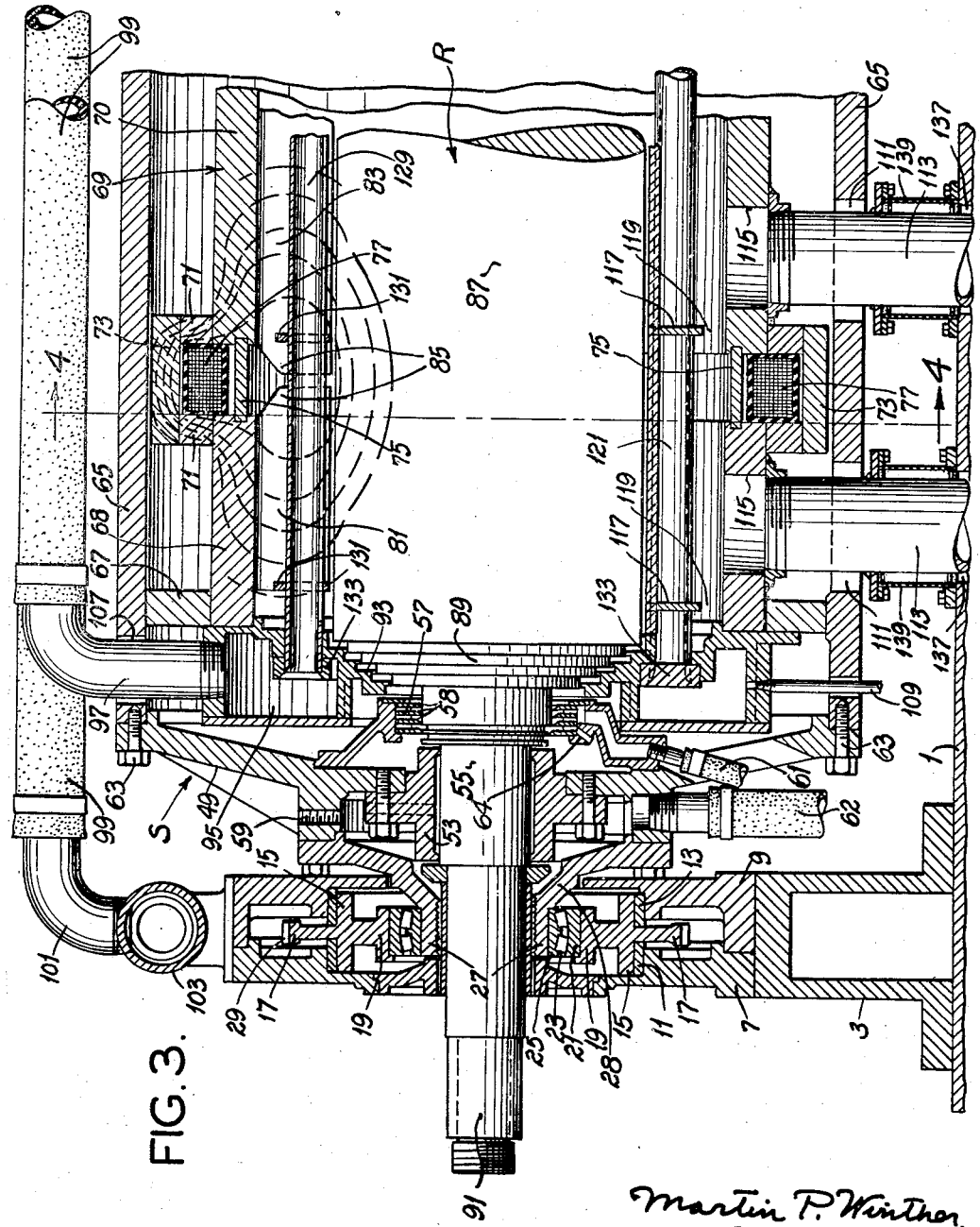
Fig. 3 is a partial longitudinal section of one unit on a slightly enlarged scale with respect to that of Fig. 1.

The stator S will now be described. It consists of opposite heads 49 and 51. Since the interior construction of the head 49 also exemplifies the interior construction of the head 51, only the former will be described in detail so far as interior parts are concerned. Referring to Fig. 3, it will be seen that the neck 27 is on a bell 28 bolted to the head 49. In addition there is bolted to the inside of the head 49 a sleeve bearing 53 which supports a gudgeon 55 of a rotor R, also to be described. A labyrinth assembly 57 is carried on the inside of the head 49 and has annular labyrinth dams 58 engaging portions toward the rotor R of the gudgeons 55. One or more oil leads 59 having flexible exterior connections lead oil to the bearings 53 and an overflow of pipe 62 carries off excess oil and foreign material. A flexibly connected air port 61 serves to apply pressure to resist incipient leakage into the labyrinth packing 57, the outlet for this air being shown at 64.

The outer periphery of each head such as 49 is bolted as indicated at 63 to an outer cylinder 65. Within endwise rings 67 this cylinder carries an inner magnetic cylinder 69 made up of a series of rings 68 and 70. These rings are joined by pocket-forming rings 71 and 73 also composed of magnetic material. They are also joined by means of preferably nonmagnetic rings 75, although the latter may be magnetic, since the flux leakage lost through them is ordinarily negligible. Members 65, 67, 69, 71, 73 and 75 are suitably welded to form a double-walled hollow cylindrical rotor unit having the heads 49 and necks 27.

Within each annular recess formed by the rings 71 and 73 is a peripherally wound field coil 77. One coil is shown in Fig. 3 but it will be understood that toward the opposite end of the machine is another similar coil symmetrically located with respect to a central plane.

Welded to the top arcuate portions (but not the bottom) of the rings 68 and 70 are longitudinal magnetic teeth 81 and 83. These extend radially (Fig. 4). As indicated at 85, their ends extend under the coils 77. These teeth are widely spaced and their ends are tapered down preferably to provide for approximate flux saturation from their ends. The toric flux field generated by one of the coils 77 is indicated in Fig. 3 by dotted lines. It engenders, for example, a series of north poles in the teeth 81 within ring 68 and a series of opposite south poles in teeth 83. If desired this polarity may be reversed by changing the direction of current through the coils 77. This flux traverses the drum 87 which forms the main part of the rotor R. Thus if the rotor, which is also magnetic, is caused to rotate, eddy currents are engendered therein, and the resulting reactive flux field applies torque to the stator S through the teeth 81 and 85. This torque is in a proportion to the energy transformation accomplished by the heating of the cylinder 87 by the eddy currents.

The cylinder 87 is solid and preferably made of generator steel. It has a solid stepped connection 89 with the gudgeon 55. The gudgeon 55 also has a solid connection with the shaft 91 which extends from the machine for attachment of an engine to be tested or for attachment to another dynamometer unit as will be described. The stepped connection 89 cooperates with a stepped labyrinth 93 formed on the inside of an endwise water ring 95. The cooperating steps 89 and 93 act as an additional liquid dam.

A header ring 95 is attached at each end of the inner cylinder 69 formed by the rings 68 and 70, the outer cylinder 65 overlapping 95 endwise. Each ring 95 includes at the top a pair of water inlets 97 having flexible connectors 99 reaching to the opposite end of the machine. These sets of flexible connectors 99 have connections 101 with water manifolds 103. The manifold at the end of the machine corresponding to the pedestal 3 is carried on the enclosures 7, 9. The manifold 103 carried at the other end of the machine (Fig. 2) is located upon a bearing assembly 105, supported on the pedestal 5. This bearing assembly 105 is similar to the one above pedestal 3 and also includes a bearing rotating apparatus such as shown in Fig. 5. The purpose of thus oppositely connecting the manifolds 103 is so that the flexible connections 99 may be as long as possible for maximum flexibility. The reason for making the water connections 99 in multiple, is that such connections have less resistance against bending than a single one of the same capacity. Thus another source of parasitic torque on the stator is minimized. The connections 97 pass through the outer cylinder 65 through openings 107. Each water ring 95 is provided with a lower drain pipe as indicated at 109.

The outer casing 65 is provided in its bottom with relatively large openings 111 through which extend drain pipes 113. Pipes 113 are in communication with openings 115 in the bottom of the inner cylinder composed by the rings 68 and 70.

The means for carrying water from the end liquid manifold rings 95 to the outlets 115 is as follows, referring to Figs. 3 and 4. At intervals along the bottom of the rings 68 and 70 are supporting cross bridge plates 117. Each clears the bottoms by means of an opening 119. Each in effect forms an arch or bridge for accommodating free liquid flow beneath it. Each is perforated to carry axially disposed water tubes 121. Each tube 121 is axially slotted as at 123 adjacent to the rotor cylinder 87 so as to project a sheet of water against that cylinder. Notches which hold tubes 121 in the plates 117 allow the issuing sheet to be continuous throughout the length of the cylinder 87.

Axially disposed deflectors 125 are used above the lower nest of tubes 121 thus formed. A deflector 127 is also used between groups of five of these pipes and located at the bottom of the bridge plates 117. These deflectors 125 and 127 serve also as stiffening members between the bridged supports 117. From Fig. 4 it will be noted that the bridge supports 117 are welded to the inside of the rings 68 and 70.

A single additional pipe 129 is used axially between the two uppermost groups of teeth 81 and 83, the same being fastened to these by means of welded web plates 131. This pipe, like the pipes 121, is axially slotted adjacent the cylinder 87 to project liquid thereon. It is preferable that all of the pipes 121 and 129 be nonmagnetic, such as of brass, so that they do not act as short circuits for the flux field issuing from the teeth 81.

All of the pipes 121 and 129 at opposite ends of the machine are fastened into header rings 133 which form suitable inlets for the pipes from the ring manifolds 95.

From the above it is evident that if water under suitable pressure (which may be low) is introduced into the end rings 95 it will progress to the pipes 121 and 129 and issue in radially directed, longitudinal sheets against the rotor cylinder 87. It will be noted however that by far the greatest volume of water issues from the ten pipes at the bottom of the machine against the under side of the cylinder 87 and that only a small amount, one-tenth (for example) by comparison, issues from the other pipe 129 against the upper side of the cylinder. This is an important feature of the invention, taken in connection with the use of a limited number only of flux-concentrating teeth 81 over the upper arc of said cylinder 87 and in connection with free drainage facilities. The space below and between the rotor R and stator S is of sufficient volume to accommodate a pool of coolant without the rotor dipping therein.

The cylinder 87 is heated strongly under the teeth 81, due to the heavy eddy currents engendered therein. The heated surface then quickly sweeps down into a voluminous flood of coolant (water for example) opposite the lower pipes 121. This large flood of coolant may safely be applied because in this region there are no radially extending teeth which might otherwise tend to cause churning, unsteady, parasitic, hydraulic action of the dynamometer. The excess of coolant descends to the bottom of the hollow cylinder composed by the rings 69 and 70 and passing underneath the bridge supports 117, passes to the outlets 115.

On the upper region of the cylinder 87, where the flux-concentrating teeth 81 are located, there is very little water applied. This additional water is only sufficient to prevent excessive heating in the cylinder 87 under the teeth 81. The deflectors 125 and 127 tend to baffle the streams of water below the cylinder 87 and to prevent them from progressing upward.

Water is carried off from the outlets 115 to the pipes 113 into a hollow base 135 of which the platform 1 is the top. Relatively large openings 137 are applied in the top 1 movably to accommodate the pipes 113, and the latter are connected to the top 1 by flexible connectors 139 so as to prevent vapor and the like from issuing from the base 135. In the base 135 is a suitable coolant sump 141 from which the received hot water is pumped to cooling apparatus, or if desired for recirculation or may be thrown away to waste. The base also contains whatever auxiliaries may be required, such as an oil pressure lubricating system etc.

It will be seen from the above that the cylinder 87, the stepped down portion 89, gudgeon 55 and shaft 91 are all made integral and solid. This also favors high rotative speeds in addition to the diameter of the cylinder 87 being kept down as much as possible while relying upon length increase for increased capacity.

It will be noted also that the stator S is built up by welding from various cylinders, rings and the like. This provides a substantial amount of empty space between rings 69, 70, 73 and the outer cylinder 65. Hence a rigid double-barreled stator structure is obtained accommodating the coil 77 and an ample flux path without increasing the weight of the stator unduly. By this means undue flux wandering is also prevented since it is confined entirely to the inner barrel 69, 71, 73, 70. In this respect it is important that the ring 73 be separated from the outer cylinder 65 by means of an air gap so that there will not be a loss of flux from the flux circuits to outer cylinder 65.

The rings 69 and 70 joined by the rings 71 and 75 form an inner waterproof structure joined to the outer cylinder 65 by means of the spacing rings 67. This construction provides good rigidity without commensurate increase of weight in the stator. It also provides recessed spaces for the coils 77 which need to be located behind the teeth 81, 83. The hollow heads 49 with the contained but separate headers 95 favor a light construction without sacrifice of strength.

Figure 6:
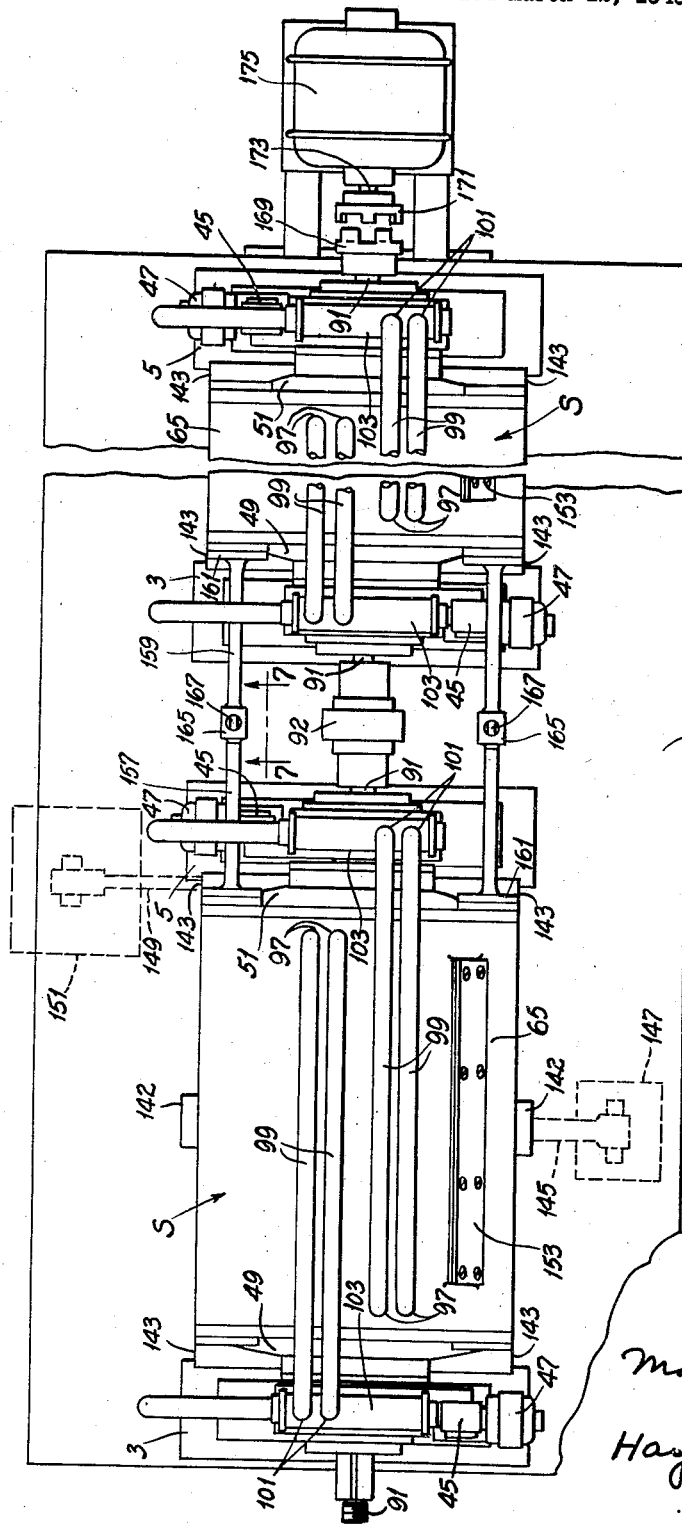
Fig. 6 is a diagrammatic plan view of several combined units embodying other features of the invention.

Each unit (one of which has been above described) is arranged to be coupled in co-axial tandem with another so that a line of units may be used together, as shown by Fig. 6. Fig. 6 shows, for example, two units coupled together (one fragmentary), but it will be understood that three, four or more may be coupled for unitary action in tandem. The capacity above quoted, namely, 15,000 H. P. absorptive capacity is for four units of the type above described coupled in tandem. This tandem coupling allows for a large increase in speed because capacity is increased without undue increase in diameter of the cylinders 87. With smaller cylinders such as 87 higher speeds are better tolerated.

The exterior of the apparatus will now be described in connection with Figs. 2, 6, and 7. Each outer case or stator S is provided with opposite pads 142 for attachment on one or the other side of a suitable arm for reaching to weighing apparatus for measuring force at a known radius for calculating torque. Opposite threaded sockets 143 are also employed for application in one of said sockets of a suitable arm (extending in the opposite direction from the arm in pad 142) to support a dead weight. In Fig. 6 an arm on a pad 142 is diagrammatically shown in dotted lines at 145 and the weighing scale at 147.

On the opposite side is shown in dotted lines an arm 149 threaded into a socket 143 and supporting a dead weight 151. By this means the amount of weighing that needs to be done by means of the scale 147 in order to measure a given torque is reduced by the amount of torque supplied by the dead weight 151. The amount of the weight 151 of course will be known, and its moment plus that applied by the scale 147, will give the total moment applied to the case. In Fig. 2, is shown a cover 153 which is located over an inspection opening.

Figure 7:
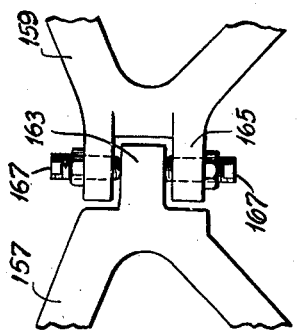
Fig. 7 is a detail section taken on line 7—7 of Fig. 6.

Coupling means are used between successive units in tandem as shown in Figs. 6 and 7. Coupling is accomplished by providing at each end of a given unit two pairs of pads 155 (see also Fig. 2) for receiving extension trusses. The trusses on each side between adjacent units are indicated at 157 and 159 in Fig. 6. All of the trusses 157 and 159 are of general triangular shape, each having feet 161 for application to one of the pair of pads 155. Each 157 ends in a tongue 163. Each truss 159 ends in a clevis 165. When bolted into position the tongues 163 lie within the mouths of the clevises 165. Adjusting bolts 167 in opposite sides of the clevises 165 serve properly to eliminate lost angular motion. The rotor shafts 91 are connected by couplings 92, as shown between the units in Fig. 6.

It will be observed that if desired, added dead weights such as 151 may be applied to each of the units in the series. More arms such as 145 and scale 147 may also be used. But it is usually preferable to use one arm and one scale on a more or less central one of the units and also to apply a single arm 149 and single dead weight 151 to said more or less central unit. Through the truss couplings all of the torque from all units may be weighed from one.

The break line in Fig. 6 indicates that more units may be inferred to be in the line of two shown therein.

The endmost unit, which is shown at the right in Fig. 6, may have its shaft provided with a splined slidable crown coupling 169 for engagement and disengagement with a cooperating crown coupling 171 on the shaft 173 of a motor 175. The purpose of this is to provide means for turning the rotor for cleaning operations and the like, independently of any driving engine, or to rotate said rotor for other than testing purposes.

From the above it will be seen that I have provided small-diametered dynamometer means which is safe at high speeds for absorbing large amounts of energy and for accurately measuring the resulting torque for computing horsepower. The system employed lends itself to indefinite increase in capacity without increasing rotor sizes by multiplying the units used in tandem. It is also reversible, the opposite pads 142 and sockets 143 being for the purpose of properly oppositely applying the weights and scales under such circumstances. Thus it is particularly adaptable to a wide range of cases where dynamometers are required. In any multiple of units the action is smooth because of the large reduction in parasitic hydraulic torque which in the ordinary machine builds up vibrations. Such vibrations in tandem units would become periodic and the present means minimizes this contingency.

While the invention is disclosed in connection with a dynamometer application, it will be understood that it is also applicable to similar apparatus, such as slip couplings, brakes and the like.

In view of the above, it will be seen that the several objects of the invention are achieved and other advantageous results attained.

As many changes could be made in the above constructions without departing from the scope of the invention, it is intended that all matter contained in the above description or shown in the accompanying drawings shall be interpreted as illustrative and not in a limiting sense.

I claim:

1. Apparatus of the class described comprising inner and outer relatively rotary members which are substantially radially spaced, flux-concentrating poles extending from one of the members toward the other and into close proximity with the latter, said poles being peripherally spaced throughout an arc over only upper portions of said inner member, a field coil in one of the members adapted to generate a flux field interlinking the members through said poles, axial conduit means located between said members and having openings directed against one of the members for flooding it with a liquid coolant, means for introducing coolant into said conduit means, the space between said members being sufficient to accommodate beneath the inner member a relatively large pool of coolant without the rotor dripping therein.

2. Apparatus of the class described comprising inner and outer relatively rotary members which are substantially radially spaced, flux-concentrating poles extending from one of the members toward the other and into close proximity with the latter, said poles being peripherally spaced throughout an arc over only the upper portion of said inner member, a field coil in one of the members adapted to generate a flux field interlinking the members through said poles, conduit means located between said members and having openings directed against one of the members for flooding it with a liquid coolant, that portion of the conduit means which supplies most of the coolant being located between said members throughout an arc under only lower portions of the inner member, the space between said members being sufficient to accommodate beneath the inner member and in the outer member a relatively large pool of coolant without the inner member dipping therein.

3. A dynamometer comprising a rocking stator, an eddy-current rotor therein, said stator and rotor being substantially radially spaced, flux-concentrating poles extending from the stator toward the rotor and into relatively close proximity with the latter to form flux gaps, said poles being spaced throughout an arc over only upper portions of the rotor, a field coil in the stator for generating a flux field interlinking the stator and the rotor through said poles, axially located conduit means between the rotor and the stator having openings directed toward the rotor for flooding it with a coolant, and means for introducing coolant into said conduit means, the space between the rotor and the stator adjacent the conduit means being of sufficient volume to accommodate a relatively large pool of coolant.

4. A dynamometer comprising a rocking stator, an eddy-current rotor therein, rotary liquid sealing means between and near the ends of the rotor and the stator, said stator and rotor being substantially radially spaced, axial flux-concentrating polar teeth extending from the stator toward the rotor and into close proximity with the latter, said teeth being peripherally spaced throughout an arc only over upper portions of the rotor, a field coil in the stator for generating a flux field interlinking the stator and the rotor through said teeth, axially located conduit means between the rotor and the stator having openings directed toward the rotor for flooding it with a coolant, means for introducing coolant into said conduit means, the space between the rotor and the stator adjacent the conduit means being of sufficient volume to accommodate a relatively large circulating pool of coolant without the rotor dipping therein, and at least one axial conduit means over the upper arc of the rotor in the space between it and the stator and between said teeth which pipe is also open toward the rotor for projecting coolant thereon, the amount of cooling medium applied to the rotor from said last-named conduit being substantially less than the volume of cooling medium applied below the rotor from said first-named conduit means.

5. A dynamometer comprising a rocking stator, a rotor within the stator and having rotary liquid end seals with respect thereto, said rotor and said stator having relatively large radial spacing, axially extending magnetic pole means attached to the rotor and extending toward only upper arc portions of the rotor, field means in the stator generating a flux field interlinking the stator, the rotor and said axial poles, coolant pipes axially located in the space between the rotor and the stator, headers in the stator, said pipes having open ends communicating with said headers and having openings along their length directed toward the rotor for amply flooding it with coolant, said pipes being located around the lower arc of the rotor in radial space sufficient to form a substantial pool of coolant without the rotor dipping therein.

6. A dynamometer comprising a rocking stator, a rotor within the stator and having rotary liquid end seals with respect thereto, said rotor and said stator having relatively large radial spacing, axially extending magnetic pole means attached to the stator and extending toward only upper arc portions of the rotor, annular field means in the stator generating a toric flux field interlinking the stator, the rotor and said axial poles, a plurality of coolant pipes axially located in the space between the rotor and the stator, annular headers in the rotor, said pipes having open ends communicating with said headers and having openings along their lengths directed toward the rotor for flooding it with coolant, the number of pipes applying the greater amount of coolant being located under the lower arc of the rotor, the space between said lower arc of the rotor and that of the stator being sufficient to carry a substantial pool of coolant without the rotor dipping therein.

7. A dynamometer comprising a composite rocking stator, said stator consisting of an outer wall and a spaced internal wall, the latter having axial inwardly directed polar teeth and being provided with at least one outwardly extending peripheral recess, an annular field coil in said recess, a rotor located within the stator and substantially spaced therefrom radially, said rotor having endwise portions extending from the stator, endwise coolant seals between the stator and the rotor, annular coolant headers in the ends of the stator, and coolant pipes extending between communications with said headers and through the space between the rotor and stator.

8. A dynamometer comprising a composite rocking stator, said stator consisting of an outer wall and a spaced internal wall, the latter having axial inwardly directed polar teeth and being provided with at least one outwardly extending peripheral recess, an annular field coil in said recess, a rotor located within the stator and substantially spaced therefrom radially, said rotor having endwise portions extending from the stator, endwise coolant seals between the stator and the rotor, annular coolant headers in the ends of the stator, and coolant pipes extending between communications with said headers and through the space between the rotor and stator, said polar teeth extending into close proximity to the rotor surface.

9. A dynamometer comprising a composite rocking stator, said stator consisting of an outer wall and a spaced internal wall, the latter having axial inwardly directed polar teeth and being provided with at least one outwardly extending peripheral recess, an annular field coil in said recess, a rotor located within the stator and substantially spaced therefrom radially said rotor having endwise portions extending from the stator, endwise coolant seals between the stator and the rotor, annular coolant headers in the ends of the stator, and coolant pipes extending between communications with said headers and through the space between the rotor and stator, said polar teeth extending into close proximity to the rotor surface, most of the pipes lying in a peripheral region outside of that of the teeth and therebelow.

10. A dynamometer comprising a rocking stator having inwardly directed polar teeth, a rotor within the stator and substantially spaced therefrom radially, said teeth extending from the stator with their ends in close proximity to the rotor, said rotor having endwise portions extending from the stator, coolant seals between the stator and the rotor, liquid headers carried by the stator, coolant conduits extending between communications with said headers and located in the space between the stator and the rotor and having coolant flooding openings directed toward the latter, the conduits which supply most of the coolant lying in a peripheral region outside of that of said polar teeth and therebelow, and a peripheral field coil supplying a toric flux field interlinking the stator, rotor and polar teeth.

11. A dynamometer comprising a rocking stator having inwardly directed polar teeth, a rotor within the stator and substantially spaced therefrom radially, said teeth extending from the stator with their ends in close proximity to the rotor, said rotor having endwise portions extending from the stator, endwise coolant seals between the stator and the rotor, liquid headers carried at opposite ends of the rotor, coolant conduits extending between communications with said headers and located in the space between the stator and the rotor and having coolant flooding openings directed toward the latter, the conduits supplying most of the coolant lying in a peripheral region outside of that of said polar teeth and therebelow, and a peripheral field coil supplying a toric flux field interlinking the stator, rotor and polar teeth.

12. A dynamometer comprising a rocking stator, said stator consisting of an outer sleeve and a spaced internal composite sleeve, the latter being provided with at least one outwardly extending peripheral recess, an annular field coil in said recess, a rotor located within the stator, said rotor having endwise portions extending from the stator, endwise seals between the stator and the rotor, and flux-concentrating teeth extending from the inner sleeve toward the rotor, the radial spacing between the rotor and said inner sleeve being substantial, axially located pipes between the inner sleeve and the rotor having openings for impinging coolant against the rotor, said stator having at least one hollow annular header with which said pipes communicate for receiving coolant.

13. A dynamometer comprising a rocking stator, a rotor located within the stator, said rotor having endwise portions extending from the stator, endwise seals between the stator and the rotor, flux-concentrating polar teeth extending from the inner sleeve toward the rotor, an annular field coil providing a flux field interlinking the rotor, stator and polar teeth, the radial spacing between the rotor and said inner sleeve being substantial, axially located pipes between the inner sleeve and the rotor having openings for impinging coolant against the rotor, said stator having hollow annular endwise headers for coolant with which said pipes communicate, flexible feed lines connected to said headers respectively and extending above the stator in opposite directions, each feed line receiving its coolant from a point at the end of the rotor which is opposite to the end at which the feed line is connected to its respective header.

14. A dynamometer comprising a rocking stator having inwardly directed polar teeth, a rotor within the stator and substantially spaced therefrom radially, said teeth extending from the stator with their ends in close proximity to the rotor, said rotor having endwise portions extending from the stator, endwise coolant seals between the stator and the rotor, liquid headers carried at opposite ends of the rotor, a plurality of coolant pipes extending between communications with said headers and located in the space between the stator and the rotor and having coolant flooding openings directed toward the latter, the pipes supplying most of the coolant lying in a peripheral region outside of that of said polar teeth and therebelow, and a peripheral field coil supplying a toric flux field interlinking the stator, rotor and polar teeth.

15. A dynamometer comprising bearing pedestals, a hollow stator mounted to rock in said pedestals, a rotor having bearings in the stator and having end portions extending therefrom, coolant-receiving means at opposite ends of said stator, separate flexible coolant supply pipes attached to said coolant-receiving means respectively, coolant-supply headers mounted upon said pedestals, each flexible coolant supply pipe which is connected to one receiving means communicating with the header on the pedestal which is at the opposite end of the stator.

16. A dynamometer comprising a stator, an annular field coil in the stator, a rotor within the stator passing through said coil, said stator and rotor being amply spaced radially, flux-concentrating teeth in the flux circuit of said coil and extending from the stator and into close proximity to the rotor surface at upper arcuate portions of the latter, endwise coolant headers in the stator, coolant pipes connecting said headers, said pipes having coolant openings adjacent the rotor and at its lower arcuate portions for projecting coolant against the rotor, said pipes being in the space between the rotor and the stator and connecting said headers, and supports for the pipes at intervals along the stator but bridging its bottom portion to allow for a substantial pool of coolant, said stator having bottom outlet means from the pool of coolant.

17. A dynamometer comprising a hollow cylindric stator, a cylindric rotor therein and amply spaced therefrom radially, annular coolant headers at the ends of the stator, coolant pipes connecting said headers and having coolant projection openings directed toward the stator, the number of pipes carrying the greatest coolant volume being distributed adjacent the lower arc of the rotor, and flux-concentrating poles projecting from the inside of the stator into close proximity with respect to the rotor over upper arcuate portions thereof, and at least one annular field coil carried by the rotor and supplying a flux circuit through the rotor, poles and stator.

18. Apparatus of the class described comprising inner and outer relatively rotary members which are substantially radially spaced, flux-concentrating poles extending from one of the members toward the other and into close proximity with the latter, a field coil in one of the members adapted to generate a flux field interlinking the members through said poles, said poles being peripherally spaced with a majority of them located in a predetermined upper arc between the adjacent peripheries of the rotary members, thereby leaving in the remaining arc between said adjacent peripheries a space which is less obstructed by poles than is the space in said upper arc, means for spraying coolant onto the inner rotary member primarily from said relatively unobstructed space, said outer member having coolant outlet means from said relatively unobstructed space which will let out coolant from the outer member, the arrangement being such that no pool of coolant in said relatively unobstructed space touches the rotor.

MARTIN P. WINTHER.